(12) United States Patent
Brown et al.

(10) Patent No.: US 7,498,708 B2
(45) Date of Patent: Mar. 3, 2009

(54) DESIGN OF THE MAGNET AND WEBS IN INTERIOR PERMANENT MAGNET ROTORS

(75) Inventors: Gerald Brown, Radford, VA (US); Ron Bishop, Radford, VA (US)

(73) Assignee: Kollmorgen Corporation, Radford, VA (US)

( * ) Notice: Subject to any disclaimer, the term of this patent is extended or adjusted under 35 U.S.C. 154(b) by 0 days.

(21) Appl. No.: 11/258,181

(22) Filed: Oct. 26, 2005

(65) Prior Publication Data
US 2006/0119203 A1 Jun. 8, 2006

Related U.S. Application Data

(60) Provisional application No. 60/622,290, filed on Oct. 26, 2004.

(51) Int. Cl.
*H02K 1/27* (2006.01)
(52) U.S. Cl. ............... 310/156.08; 310/156.53; 310/156.56
(58) Field of Classification Search ........... 310/156.53, 310/156.56–156.57, 216, 261, 156.08
See application file for complete search history.

(56) References Cited

U.S. PATENT DOCUMENTS

| | | | |
|---|---|---|---|
| 6,225,724 B1 * | 5/2001 | Toide et al. ............. | 310/216 |
| 6,259,181 B1 * | 7/2001 | Kawano et al. ............. | 310/162 |
| 6,441,524 B2 * | 8/2002 | Kaneko et al. ............. | 310/156.45 |
| 6,815,858 B2 * | 11/2004 | Matsunobu et al. ...... | 310/156.45 |
| 6,815,859 B2 * | 11/2004 | Sakuma et al. ............. | 310/156.53 |
| 6,987,341 B2 * | 1/2006 | Chang et al. ............. | 310/156.45 |
| 7,038,345 B2 * | 5/2006 | Fratta ............. | 310/156.53 |
| 7,091,643 B2 * | 8/2006 | Burgbacher ............. | 310/156.53 |

OTHER PUBLICATIONS

Edward Lovelace et al., "Design and Experimental Verification of a Direct-Drive Interior PM Synchronous Machine Using a Saturable Lumped-Parameter Model", IEEE, 2002, pp. 2486-2492.

* cited by examiner

*Primary Examiner*—Tran N Nguyen
(74) *Attorney, Agent, or Firm*—Morgan & Finnegan LLP

(57) ABSTRACT

A rotor includes a rotor core formed of webs defining a layout of the magnets in the rotor core. The rotor core has at least one layer of magnets forming a plurality of poles. Each pole includes a plurality of slots for holding a magnet, at least two ribs comprising web portions between the centerline slot and each wing slot, and a plurality of magnets arranged in corresponding slots. The slots have at least a centerline slot and two angled wing slots extending from a position at or around respective ends of the centerline slot towards an outer circumference of the rotor core. The wing slots may taper from a position at or around respective ends of the centerline slot towards an outer circumference of the rotor core.

18 Claims, 3 Drawing Sheets

300

DESIGN OF THE MAGNET AND WEBS IN INTERIOR PERMANENT MAGNET ROTORS

This application claims priority to U.S. Provisional Application Ser. No. 60/622,290, filed Oct. 26, 2004, entitled, "Magnet and Webs in Interior Permanent Magnet Rotors", of which the entire contents is incorporated herein by reference.

FIELD OF THE INVENTION

The present invention relates to a rotor for an interior permanent magnet (IPM) machine or motor or, more specifically, to a design of the magnet and webs in IPM rotors in multiphase synchronous motors.

BACKGROUND

IPM motors or machines generally include a stator with excitation windings and a rotor having embedded magnets, e.g., an interior permanent magnet rotor. These rotors allow permanent magnet synchronous motors to operate with constant power over a wide range of speeds. The magnitude of this range of speeds, i.e. the ratio of the maximum speed to the minimum over which the constant power is maintained depends on the ratio of the inductances along the two orthogonal axes—one in the direction of the magnet flux referred to as the d axis and the other 90 electrical degrees from the d-axis, called the q-axis.

In designing such motors, various factors need to be addressed including among other things mechanical stress during operation, flux leakage and/or cogging torque.

SUMMARY

An object of the invention is to provide a rotor design which addresses among other things mechanical stress during operation, flux leakage and/or cogging torque.

In accordance with one embodiment, a rotor includes a rotor core formed of webs defining a layout of the magnets in the rotor core. The rotor core has at least one layer of magnets forming a plurality of poles. Each pole includes a plurality of slots for holding a magnet, at least two ribs comprising web portions between the centerline slot and each wing slot, and a plurality of magnets arranged in corresponding slots. The slots have at least a centerline slot and two angled wing slots extending from a position at or around respective ends of the centerline slot towards an outer circumference of the rotor core. The rotor core may be cylindrical and formed of stacked metal lamination or powdered pressed metals.

The wing slots may taper from a position at or around respective ends of the centerline slot towards an outer circumference of the rotor core. An amount each wing slot may be tapered may be configured to minimize resulting cogging while maximizing an average torque.

The centerline slot may be two slots having a rib therebetween. The rotor core may include at least two layers of magnets comprising an inner layer and an outer layer, the inner layer being closer to a center of the rotor core.

Each pole may include at least inner and outer pole layers. Each of the pole layers includes a plurality of slots for holding a magnet, the slots having at least a centerline slot and two angled wing slots extending from a position at or around respective ends of the centerline slot towards an outer circumference of the rotor core; at least two ribs comprising web portions between the centerline slot and each wing slot; and a plurality of magnets arranged in corresponding slots. The wing slots of the inner and outer pole layers may taper from a position at or around respective ends of respective centerline slots towards an outer circumference of the rotor core.

The magnets may include at least a rectangular block magnet. Each wing slot may include two opposite sides extending towards an outer circumference of the rotor core, the two sides being nonparallel to each other. The layer of magnets may be arranged inside the rotor core around a periphery of the rotor core.

In a further embodiment, a rotor includes a rotor core formed of webs defining a layout of the magnets in the rotor core. The rotor core has a plurality of poles. Each pole has a plurality of slots for holding a magnet, the slots having at least a centerline slot and two angled wing slots extending from a position at or around respective ends of the centerline slot and tapering towards an outer circumference of the rotor core; and a plurality of magnets arranged in corresponding slots. The rotor core may be cylindrical and formed of stacked metal lamination or powdered pressed metals.

An amount each wing slot may be tapered may be configured to minimize resulting cogging while maximizing an average torque. The centerline slot may be two slots having a rib therebetween.

Each pole may include at least inner and outer magnet layers. Each of the magnet layers may include a plurality of slots for holding a magnet, the slots having at least a centerline slot and two angled wing slots extending from a position at or around respective ends of the centerline slot and tapering towards an outer circumference of the rotor core; and a plurality of magnets arranged in corresponding slots.

In yet a further embodiment, a rotor includes a rotor core formed of webs defining a layout of the magnets in the rotor core, the rotor core having a plurality of poles, each pole having a magnet with a centerline portion and two angled wing portions extending from a position at or around respective ends of the centerline portion towards an outer circumference of the rotor core, the magnet being segmented into at least three parts. The rotor core may be cylindrical and formed of stacked metal lamination or powdered pressed metals.

Each pole may include inner and outer pole layers. Each pole layer may include a magnet shaped with a centerline portion and two angled wing portions extending from a position at or around respective ends of the centerline portion towards an outer circumference of the rotor core, the magnet being segmented into at least three parts.

DETAILED DESCRIPTION OF THE VARIOUS EMBODIMENTS

Figure 1:
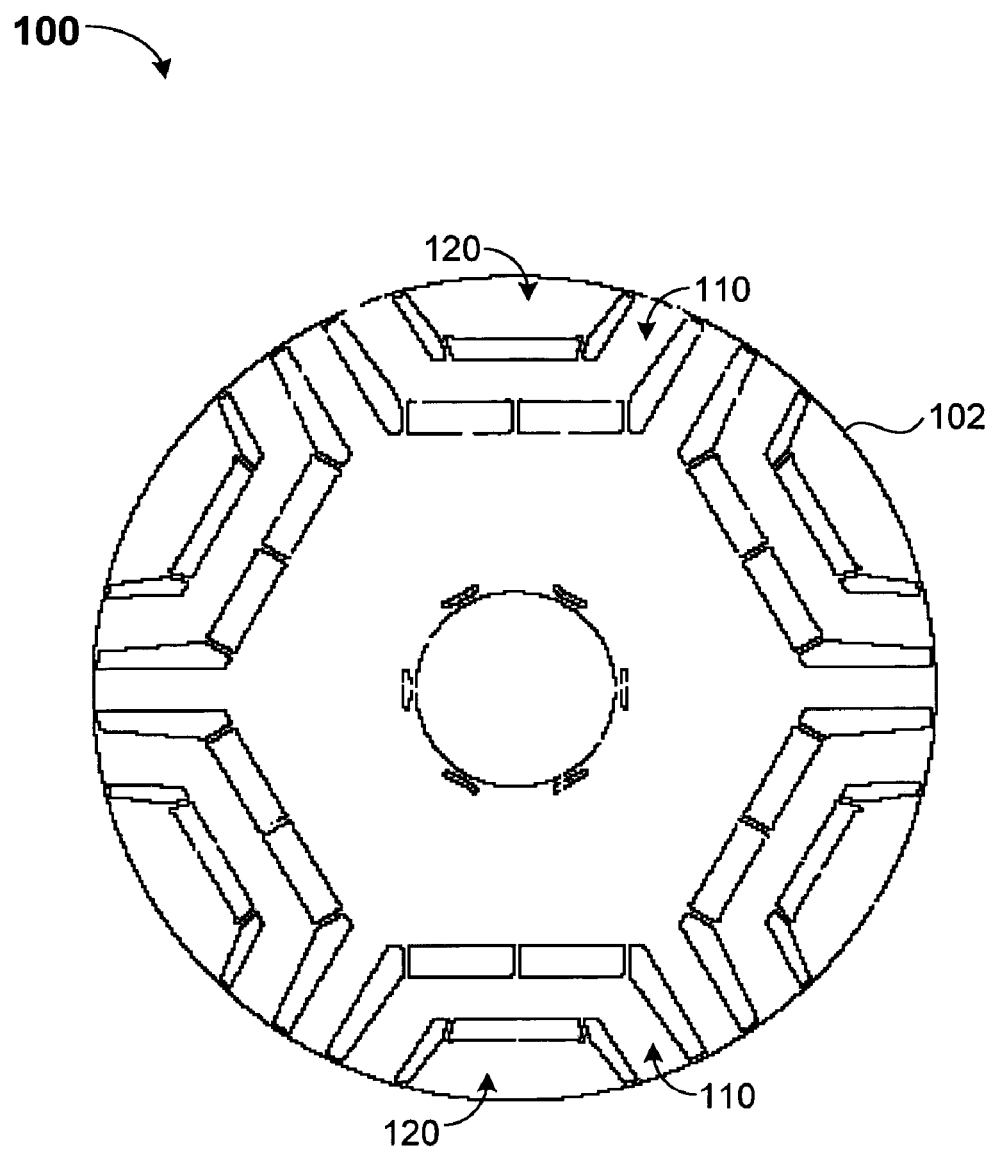
FIG. 1 illustrates and exemplary IPM rotor.

In accordance with various aspects, a design of the magnet and webs in IPM rotors is provided for use in motors or electric machines, such as multiphase synchronous motors. As will be described in greater detail below, the IPM rotor may be configured to optimize the number of magnet segments and webs of material used to restrain the magnets against centrifugal forces, while keeping the mechanical stresses in the webs within acceptable design limits and minimizing the amount of leakage flux that is lost in the webs.

IPM rotors are a subassembly of a permanent magnet synchronous multiphase motor. IPM rotors allow permanent magnet synchronous motors to operate with constant power over a wide range of speeds. The magnitude of this range of speeds, i.e., the ratio of the maximum speed to the minimum over which the constant power is maintained depends on the ratio of the inductances along the two orthogonal axes—one in the direction of the magnet flux referred to as the d-axis and the other 90 electrical degrees from the d-axis, called the q-axis. The ratio of these inductances, Lq/Ld, can be increased by increasing the number of layers of magnets comprising each pole.

For example, a standard and simplest form of the IPM rotor is a six pole machine, which would include six (6) magnets equally spaced at sixty (60) degrees mechanical apart, where each of the magnets is set into a slot or cutout in the lamination near a periphery of the rotor. To increase the Lq/Ld ratio, another layer of magnets can be placed at a smaller radius, closer to the center of rotor may be added. This results in at least twelve (12) magnets per rotor in a six (6) pole machine. Additional layers may be added to further increase the ratio of Lq/Ld with further improvements in the constant power range. An exemplary two-layer rotor design is described below with reference to FIGS. 1-3 in which magnets, such as rectangular block magnets, may be used as the magnet shape. Other magnet shapes may also be employed in accordance with the rotor design, in a manner described herein.

In one aspect, an IPM rotor may be held together as one piece, so webs of the steel lamination material are used to hold the rotor together and restrain the magnets and lamination against centrifugal forces which result in both tangential hoop stresses as well as radial stresses in the webs of material. In another aspect, the webs provide leakage paths for the magnet flux, so the webs need to be as thin as possible to minimize the flux leakage. The following design approaches may be employed to address the above issues.

For example, in one exemplary approach, an outermost layer of magnets of a rotor may be made to be thinner, in the radial direction, than the next inner layer toward the center and this can be continued as more layers are used. This allows the stresses in the webs of material restraining this magnet to be kept within acceptable limits and the thickness of the web required to be minimized, thereby minimizing the flux leakage.

In another exemplary approach, the magnets for a pole in the innermost layer may be split widthwise into two magnets (they could also be split into 3 or 4 segments widthwise as well), using webs of material between them in a direction ranging from parallel to the sides of the magnet to along the radial direction, to keep the web stresses within design limits while minimizing the flux leakage. This was found to be more necessary at the inner layer as compared to the outer layer, since the inner layers must carry the loads of the that layer plus the layers radically outward from that layer.

To address another issue when designing an IPM rotor, the wing slots may be tapered to reduce the cogging torque. Each magnet layer may have three regions: an inner region on either side of the poles centerline, and two outer regions (e.g., the wing slots) that extend from the inner section's outer edges to the rotor's outer diameter (OD). Rather than these wing slots having parallel sides, they should have nonparallel sides tapering from wider where they meet with the inner region to narrower near the rotor's OD. This has the very beneficial effect of greatly reducing the unwanted reluctance torque variation with rotor position (cogging) at the cost of a small reduction in the average torque. The amount of tapering in the wing magnet can be optimized to minimize the resulting cogging torque while maintaining the motor's average torque as high as possible.

An exemplary IPM rotor will be described below with reference to FIGS. 1-3. As show in FIG. 1, there is provided an exemplary IPM rotor 100 having a plurality of poles, e.g., six (6) poles. The IPM rotor 100 includes a rotor core 102 which can be formed of webs of lamination, such as steel laminations.

The rotor 100 includes a plurality of magnet layers, such as an inner layer 110 and an outer layer 120 arranged in a periphery of the rotor 100. Each layers 110, 120 includes a plurality of slots and magnets arranged in a desired pattern. The inner layer 110 is arranged around an inner radius closer to a center of the rotor 100, and the outer layer 120 is arranged around an outer radius, farther from the center of the rotor 100, than the inner layer.

Figure 2:
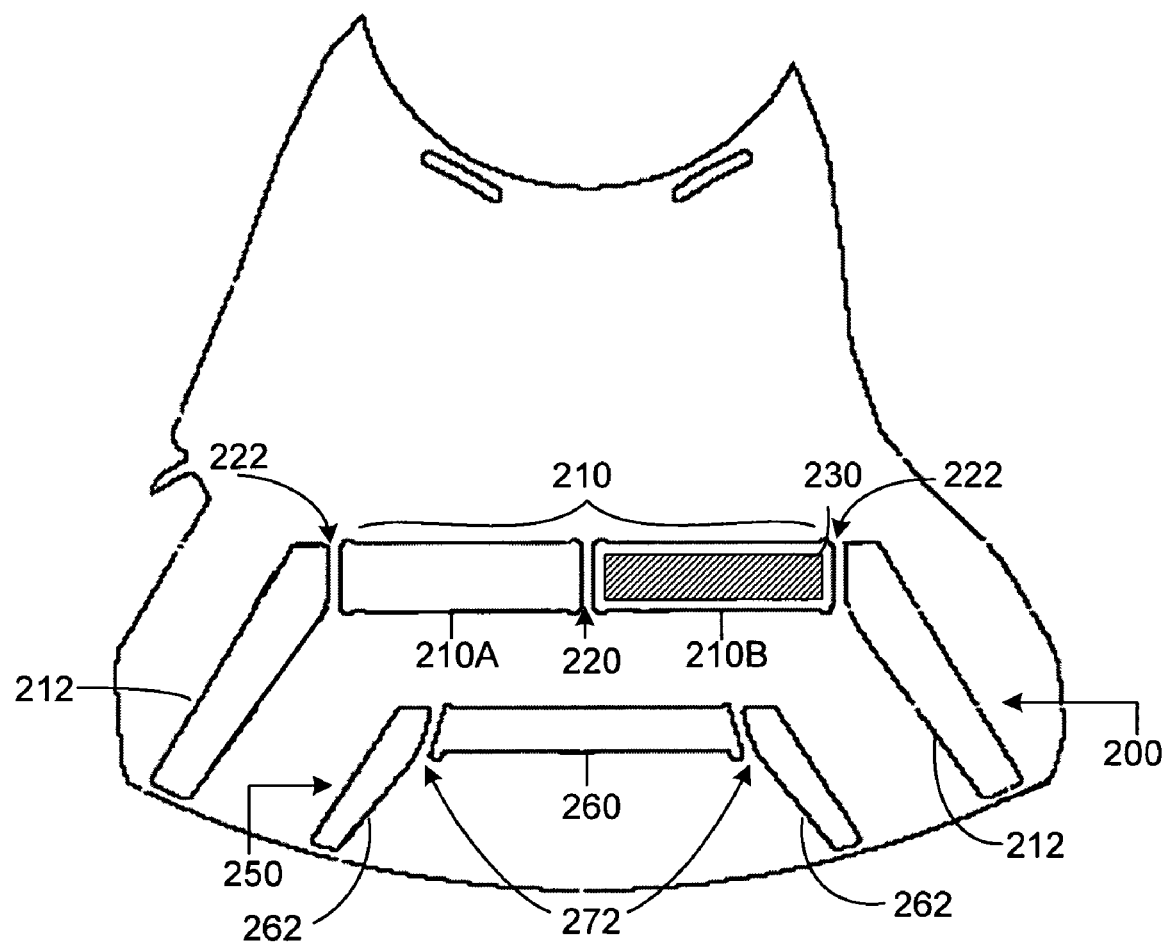
FIG. 2 illustrates a partial view of the exemplary rotor of FIG. 1 showing a pole.

As shown in FIG. 2, each pole of the rotor 100 may include an inner pole layer 200 which is part of the inner layer 110, and an outer pole layer 250 which is part of the outer layer 120.

The inner pole layer 200 includes a centerline slot 210 and two wing slots 212 which extend from a position at or around opposite ends (or edges), respectively, of the centerline slot 210 towards an outer circumference or surface of the rotor core 102. In this example, each wing slot 212 extends at an angle from a position at or around a respective end of the centerline slot 210. The centerline slot 210 may also be further segmented, as shown, to provide slots 210A and 210B. The slots 210A and 210B may be of equal or approximately equal dimensions or size.

As shown, the web material between each slot forms a rib which provide for addition stress reduction or restraint of the magnets and rotor components due to centrifugal forces, as noted above. In this example, the inner pole layer 200 has ribs 222 between each end of wing slot 212 adjacent to a respective end of the centerline slot 210, and a rib 220 between two segments or slots 210A, 210B of the centerline slot 210. The ribs may be parallel or radial to the ends, sides or edges of the slots or magnets. The inner pole layer 210 may segment the magnet to provide for multiple ribs, e.g., two (2), three (3) or more, to provide for additional stress reduction or additional restraint of the magnets and rotor components, while balancing the flux leakage.

Each wing slot 212 may also be tapered as the slot extends from an end of the centerline slot 210 towards the outer circumference or surface of the rotor core 102. This tapering may be provided by configuring the sides of the slot and/or the magnet extending towards the outer circumference or surface of the rotor core 102 to be unparallel. As discussed above, this has the very beneficial effect of greatly reducing the unwanted reluctance torque variation with rotor position (cogging) at the cost of a small reduction in the average torque. The amount of tapering in the wing magnet or slot or segment can be optimized to minimize the resulting cogging torque while maintaining the motor's average torque as high as possible. For example, wing slot 212 may taper to approximately half the width (versus the width at or around the centerline).

A magnet 230, such as a rectangular block magnet, is arranged or embedded into slot 210B. This is simply provided as an example showing that magnets, of desired shapes, e.g., block magnets, rectangular block magnets, tapered block magnets, etc., are provided or embedded in the slots of the rotor 100.

Although in the inner pole layer 200 employs a magnet segmented into four (4) segments, the inner pole layer 200 may be segmented into any number of magnet segments to provide for any number of ribs, and the magnet segments may be shaped accordingly. For example, the inner pole layer 200 may have a trapezoidal- or U-shape.

The outer pole layer 250 includes a centerline slot 260 and two wing slots 262 which extend from a position at or around opposite ends (or edges), respectively, of the centerline slot 260 towards an outer circumference or diameter of the rotor core 102. In this example, each wing slot 262 extends at an angle from a position at or around respective ends of the centerline slot 260. As with the inner pole layer 200, the centerline slot 260 may also be further segmented.

As shown, the web material between each slot forms a rib which provide for addition stress reduction or restraint of the magnets and rotor components due to centrifugal forces, as noted above. In this example, the outer pole layer 250 has ribs 272 between each end of wing slot 262 adjacent to a respective end of the centerline slot 260. The ribs may be parallel or radial to the ends, sides or edges of the slots or magnets. The outer pole layer 250 may segment the magnet to provide for multiple ribs, e.g., two (2), three (3) or more, to provide for additional stress reduction or additional restraint of the magnets and rotor components, while balancing the flux leakage.

Each wing slot 262 may also be tapered as the slot extends from an end of the centerline slot 260 towards the outer circumference or surface of the rotor core 102. This tapering may be provided by configuring the sides of the slot and/or the magnet extending towards the outer circumference or surface of the rotor core 102 to be unparallel. As discussed above, this has the very beneficial effect of greatly reducing the unwanted reluctance torque variation with rotor position (cogging) at the cost of a small reduction in the average torque. The amount of tapering in the wing magnet or slot or segment can be optimized to minimize the resulting cogging torque while maintaining the motor's average torque as high as possible. For example, wing slot 262 may taper to approximately half the width (versus at or around the centerline).

As with the inner pole layer 200, each of the slots may have a magnet, such as a rectangular block magnet, arranged or embedded therein. The magnets may take any desired shape, e.g., block magnets, rectangular block magnets, tapered block magnets, etc.

Although in the outer pole layer 250 employs a magnet segmented into four (4) segments, the outer pole layer 250 may be segmented into any number of magnet segments to provide for any number of ribs, and the magnet segments may be shaped accordingly. For example, the outer pole layer 250 may have a trapezoidal- or U-shape.

Figure 3:
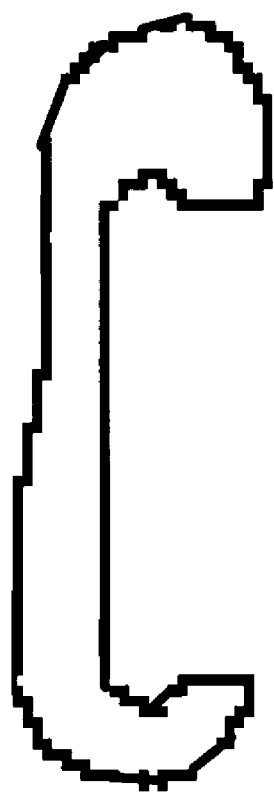
FIG. 3 illustrates a partial view of the exemplary rotor of FIG. 1 showing a stress relieving configuration of a magnet slot.

Turning to FIG. 3, a rotor core slot provided by way of example as a slot 300 may be configured with radiused undercuts, such as a fillet or radius or the like, at an end(s) of the slot to reduce stress or for stress reduction during operation. As shown in the examples of FIGS. 1-3, the centerline slot(s) may be configured with such a fillet or radius. Any of the slots of rotor core 102 may have such fillets or radii or the like, as desired.

The above rotor configuration of FIGS. 1-3 describes one example of an IPM rotor with six (6) poles and two magnet layers. The rotor 110 may however include any number of poles, and/or any number of magnet layers and/or any number of pole layers per pole and/or any number of magnet segments or ribs per pole, layer or pole layer. As described above, additional layers may also be added to further increase the ratio of Lq/Ld with further improvements in the constant power range. Further, the rotor core 102 may be cylindrical or shaped as desired and formed of stacked metal lamination or powdered pressed metals.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents. Thus, other network types are within the scope of the present invention.

What is claimed is:

1. A rotor comprising:
   a rotor core formed of webs defining a layout of the magnets in the rotor core, the rotor core having at least one layer of magnets forming a plurality of poles, each pole including:
   a plurality of slots for holding respective magnets, the slots having at least a centerline slot and two angled wing slots extending from a position at or around respective ends of the centerline slot towards an outer circumference of the rotor core,
   at least two ribs comprising web portions between the centerline slot and each wing slot, and
   a plurality of magnets arranged in corresponding slots,
   wherein each of the wing slots tapers from a position at or around respective ends of the centerline slot towards an outer circumference of the rotor core, and
   wherein the centerline slot further comprises two slots having a rib therebetween and each of the two slots have sides which extend substantially in parallel along its length.

2. The rotor according to claim 1, wherein an amount each wing slot is tapered is configured to minimize resulting cogging while maximizing an average torque.

3. The rotor according to claim 1, wherein the rotor core includes at least two layers of magnets comprising an inner layer and an outer layer, the inner layer being closer to a center of the rotor core.

4. The rotor according to claim 1, wherein each pole includes at least inner and outer pole layers, each of the pole layers comprising:
   a plurality of slots for holding respective magnets, the slots having at least a centerline slot and two angled wing slots extending from a position at or around respective ends of the centerline slot towards an outer circumference of the rotor core,
   at least two ribs comprising web portions between the centerline slot and each wing slot, and
   a plurality of magnets arranged in corresponding slots, and
   wherein the centerline slot further comprises two slots having a rib therebetween and each of the two slots have sides which extend substantially in parallel along its length.

5. The rotor according to claim 4, wherein the wing slots of the inner and outer pole layers taper from a position at or around respective ends of respective centerline slots towards an outer circumference of the rotor core.

6. The rotor according to claim 1, wherein the magnets includes at least a rectangular block magnet.

7. The rotor according to claim 1, wherein each wing slot includes two opposite sides extending towards an outer circumference of the rotor core, the two sides being nonparallel to each other.

8. The rotor according to claim 1, wherein the layer of magnets are arranged inside the rotor core around a periphery of the rotor core.

9. A motor comprising a rotor according to claim 1.

10. A rotor comprising:
a rotor core formed of webs defining a layout of the magnets in the rotor core, the rotor core having a plurality of poles, each pole having:
a plurality of slots for holding respective magnets, the slots having at least a centerline slot and two angled wing slots extending from a position at or around respective ends of the centerline slot and tapering towards an outer circumference of the rotor core, and
a plurality of magnets arranged in corresponding slots,
wherein each of the wing slots tapers from a position at or around respective ends of the centerline slot towards an outer circumference of the rotor core, and
wherein the centerline slot further comprises two slots having a rib therebetween and each of the two slots have sides which extend substantially in parallel along its length.

11. The rotor according to claim 10, wherein an amount each wing slot is tapered is configured to minimize resulting cogging while maximizing an average torque.

12. The rotor according to claim 10, wherein each pole includes at least inner and outer magnet layers, each of the magnet layers comprising:
a plurality of slots for holding respective magnets, the slots having at least a centerline slot and two angled wing slots extending from a position at or around respective ends of the centerline slot and tapering towards an outer circumference of the rotor core, and
a plurality of magnets arranged in corresponding slots.

13. A motor comprising a rotor according to claim 10.

14. A rotor comprising:
a rotor core formed of webs defining a layout of the magnets in the rotor core, the rotor core having a plurality of poles, each pole having a magnet with a centerline portion and two angled wing portions extending from a position at or around respective ends of the centerline portion towards an outer circumference of the rotor core, the magnet being segmented into at least three parts,
wherein each of the wing portions tapers from a position at or around respective ends of the centerline slot towards an outer circumference of the rotor core, and
wherein the centerline slot further comprises two slots having a rib therebetween and each of the two slots have sides which extend substantially in parallel along its length.

15. The rotor according to claim 14, wherein each pole includes inner and outer pole layers, each pole layer comprising a magnet shaped with a centerline portion and two angled wing portions extending from a position at or around respective ends of the centerline portion towards an outer circumference of the rotor core, the magnet being segmented into at least three parts.

16. A motor comprising a rotor according to claim 14.

17. The rotor according to claim 1, wherein each of the angled wing slots taper across approximately an entire length of the slot.

18. A rotor comprising:
rotor core formed of webs defining a layout of the magnets in the rotor core, the rotor core having a plurality of poles, each pole having a magnet with a centerline portion and two angled wing slots extending from a position at or around respective ends of the centerline portion towards an outer circumference of the rotor core,
wherein an angle of one or more of a web portion between an angled wing portion and the centerline portion is configured in view of magnet size and radial location to reduce mechanical stresses.

* * * * *